Oct. 17, 1944. J. BRUSSELL 2,360,472
ADJUSTABLE PRECISION TAP
Filed July 28, 1943
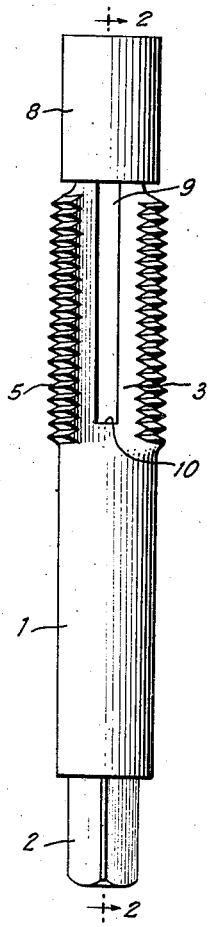
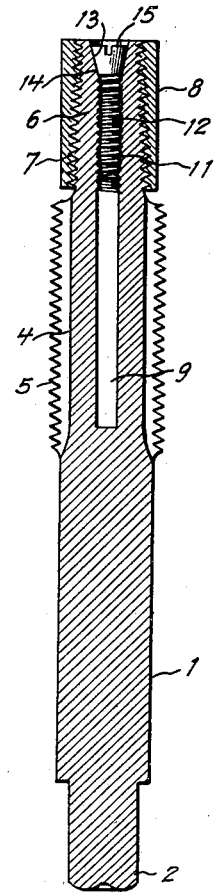
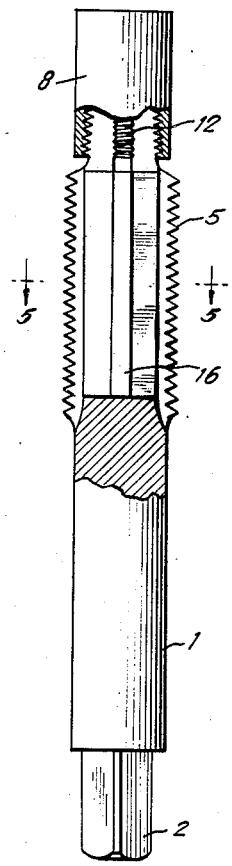
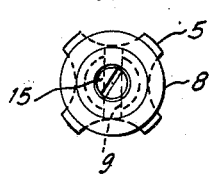
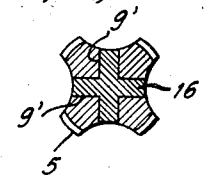
INVENTOR.
Jacob Brussell
BY
ATTORNEY Patented Oct. 17, 1944

2,360,472

UNITED STATES PATENT OFFICE 2,360,472

ADJUSTABLE PRECISION TAP

Jacob Brussell, New York, N. Y.

Application July 28, 1943, Serial No. 496,499

8 Claims. (Cl. 10—142)

The present invention is directed to taps for the cutting of threads in metal members, and more particularly, to one adapted to cut internal threads.

Taps of this type, and particularly those used for precision work where only extremely small tolerances are permissible, are relatively delicate and expensive. After a relatively short time, they tend to wear, thus cutting threads more or less inaccurately. Since such taps are expensive, it is highly desirable to increase the life thereof.

Several attempts have been made to provide an adjustable means associated with a tap in order to increase the life thereof. Generally, such devices consisted in providing a tap of the usual type having a shank and a grooved or fluted end having cutting threads or teeth formed on the ribs or lands between the flutes. A slot was formed longitudinally of the tap throughout the length of the threaded section and beyond the same to, or within the shank thereof. At the tip of the tap a tapered screw was inserted so that upon threading the screw into the end, it tended to separate the two parts of the cutting portion and thus somewhat enlarge the diameter of the outer portion of the cutting teeth. Theoretically, such a tap was capable of actively cutting threads once more, but in practice there were a number of serious disadvantages.

Due to the cutting of the slot, the tap was considerably weakened and since it is made of hard and brittle metal, it snapped off in actual use and destroyed the tap. Attempts have been made to cure this defect, by inserting one or more transverse set screws in the flutes and passing through the two sections of the tap. However, this did not cure the defect although to a certain extent decreased the tendency to snap off. However, it introduced new sources of weakness and new lines of cleavage in the tap. Because of the transverse openings in intermediate portions of the tap, the strain on the teeth caused by cutting was transmitted to the reduced cross-section and breaking off occurred at such points.

The present invention is intended and adapted to overcome the difficulties and disadvantages of prior adjustable taps, it being among the objects thereof to provide a tap which is adjustable to a considerable degree to compensate for wear and which is rigid and strong.

It is also among the objects of the present invention to provide an adjustable tap wherein a torsion-resisting element is introduced to take up the strain due to cutting, and thereby to lengthen the life of the tap.

In the accompanying drawing constituting a part hereof, and in which like reference characters indicate like parts:

Fig. 1 is a side elevational view of a tap made in accordance with the present invention;

Fig. 2 is a longitudinal cross-sectional view thereof taken along the line 2—2 of Fig. 1;

Fig. 3 is an end view thereof;

Fig. 4 is a longitudinal cross-sectional view similar to Fig. 2 and showing a modified form of the invention wherein a double slot is provided; and Fig. 5 is a transverse cross-sectional view taken along the line 5—5 of Fig. 4.

In practicing the present invention I provide a body including a shank 1 and an angular end 2 adapted to be inserted into a suitable clamp or dog, as is usual. The central portion 3 is provided with four flutes 4 extending longitudinally of the body. The upper surfaces 5 of the ribs between the flutes have cutting teeth formed therein, as usual. The outer end 6 of the body constitutes an integral extension of the central portion 3 and is tapered. It has a thread 7 formed thereon. A collar 8, the inner surface of which is similarly tapered, is formed with a thread cooperating with the tapered thread on end 6. The outer diameter of collar 8 is less than the outer diameter of portion 3, so as not to interfere with the cutting action of the teeth.

A slot 9 is cut, or otherwise formed in end 6 and portion 3 longitudinally of the body and passing through a pair of opposite flutes. The inner end 10 of the slot terminates in the central portion, a short distance above the junction of the shank with said portion.

The outer end 11 of the slot is centrally threaded and a set screw 12 is adapted to cooperate with said threaded end. The extreme outer end of the slot is formed with a tapered shoulder 13 and screw 12 is formed with a similarly tapered head 14 in order to closely engage the same. The head is provided with means 15 for turning the screw, as usual.

In the use of the tap, the screw 12 is inserted into threads 11 and head 14 is placed in such a position that it just touches beveled end 13. Collar 8 is threaded over taper 7 to hold the end 6 firmly in position. The tap is then used in cutting teeth until it has worn to an extent that it requires adjustment. To accomplish this, collar 8 is retracted a specified amount, say, one or more complete turns, thus loosening the same from the end 6. Then, by means 15, screw 12 is threaded into portion 11 and by contact of its head with bevel 13, will expand the two parts of end 6 against collar 8 and give a rigid structure. This operation may be repeated several times as the tap wears further.

In Figures 4 and 5 there is shown a modification of the invention based upon the same principles. Instead of a single cut 9, as shown in Figures 1 to 3, there are provided two slots 9' at right angles to each other, each of the slots passing through a pair of opposite flutes, as more particularly shown in Fig. 5. A cruciform filler member 16 is provided to fit into the slot and the length of said filler is sufficient to close the slots throughout the length of the toothed portion. The thickness of the filler member 16 is such that it fits relatively tightly in slots 9 before the tap has become worn.

In said modification, there is provided a strengthening feature so that the cutting away of metal to form a slot does not, to any extent, weaken the tap. If desired, a series of filler members 16 may be provided so that with each expansion of the tap for adjusting purposes, a suitable filler may be inserted to completely fill the slots. Such filler members may be used with any number of taps.

It will be noted that in accordance with the present invention a simple arrangement is provided for accurately adjusting the diameter of the cutting teeth and, furthermore, a rigid structure as a whole is provided. The torsion induced in cutting operations is adequately absorbed by the collar and its associated elements. Such a tap may be used in precision cutting, with excellent results.

Various changes may be made in the details of construction, as will be apparent to those skilled in the art, without departing from the principles herein set forth. For instance, the filler member may be of such a form that it may fit into the slot 9 of Figures 1, 2 and 3. The number of flutes may be varied, and slots may be formed in two or more of such flutes. In such case, if a filler member is used, it may be made of suitable form. Instead of the outer end 6 and collar 8 being tapered, the threads may be made of uniform diameter and the taper may be made on threads 11 and screw 12. These and other changes in the details of construction may be made within the spirit of the invention, and the same is to be broadly construed and not to be limited except by the character of the claims appended thereto.

What I claim is:

1. An adjustable tap comprising a body having a shank, the inner end having means for rotating the same, a plurality of longitudinal external flutes in the central portion of said body separating intermediate lands, cooperating cutting teeth on the lands between said flutes, the outer end of said body being tapered and of lesser diameter and having threads formed thereon, said outer end and central portion being longitudinally centrally slotted, a collar having an internal tapered thread fitted on said outer end, the outer diameter of said collar being not greater than the diameter at the root of said cutting teeth, and means in said slot for expanding the threaded lands for holding said tap rigidly against said collar.

2. An adjustable tap comprising a body having a shank, the inner end having means for rotating the same, a plurality of longitudinal external flutes in the central portion of said body separating intermediate lands, cooperating cutting teeth on the lands between said flutes, the outer end of said body being tapered and of lesser diameter and having threads formed thereon, said outer end and central portion being longitudinally centrally slotted, a collar having an internal tapered thread fitted on said outer end, the outer diameter of said collar being not greater than the diameter at the root of said cutting teeth, and means in said slot for expanding the threaded lands for holding said tap rigidly against said collar, said slotted outer end being threaded and a screw fitted therein constituting said means.

3. An adjustable tap comprising a body having a shank, the inner end having means for rotating the same, a plurality of longitudinal external flutes in the central portion of said body separating intermediate lands, cooperating cutting teeth on the lands between said flutes, the outer end of said body being tapered and of lesser diameter and having threads formed thereon, said outer end and central portion being longitudinally centrally slotted, a collar having an internal tapered thread fitted on said outer end, and means in said slot for expanding the threaded lands for holding said tap rigidly against said collar, the outer diameter of said collar being less than the root diameter across said cutting teeth.

4. An adjustable tap comprising a body having a shank, the inner end having means for rotating the same, a plurality of longitudinal external flutes in the central portion of said body separating intermediate lands, cooperating cutting teeth on the lands between said flutes, the outer end of said body being tapered and of lesser diameter and having threads formed thereon, said outer end and central portion being longitudinally centrally slotted, a collar having an internal tapered thread fitted on said outer end, the outer diameter of said collar being not greater than the diameter at the root of said cutting teeth and means in said slot for expanding the threaded lands for holding said tap rigidly against said collar, said slot terminating in said central portion, said shank being solid.

5. An adjustable tap comprising a body having a shank, the inner end having means for rotating the same, a plurality of longitudinal external flutes in the central portion of said body separating intermediate lands, cooperating cutting teeth on the lands between said flutes, the outer end of said body being tapered and of lesser diameter and having threads formed thereon, said outer end and central portion being longitudinally centrally slotted in two directions at about right angles, said slots passing through said flutes, a collar having an internal tapered thread fitted on said outer end, the outer diameter of said collar being not greater than the diameter at the root of said cutting teeth and means in said slot for expanding the threaded lands for holding said tap rigidly against said collar.

6. An adjustable tap comprising a body having a shank, the inner end having means for rotating the same, a plurality of longitudinal external flutes in the central portion of said body separating intermediate lands, cooperating cutting teeth on the lands between said flutes, the outer end of said body being tapered and of lesser diameter and having threads formed thereon, said outer end and central portion being longitudinally centrally slotted in two directions at about right angles, said slots passing through said flutes, a collar having an internal tapered thread fitted on said outer end, the outer diameter of said collar being not greater than the diameter at the root of said cutting teeth and means in said slot for expanding the threaded lands for holding said tap rigidly against said collar, said means including a bar which is cruciform in cross-section fitted into said slots within said central portion.

7. An adjustable tap comprising a body having a shank, the inner end having means for rotating the same, a plurality of longitudinal external flutes in the central portion of said body separating intermediate lands, cooperating cutting teeth on the lands between said flutes, the outer end of said body being tapered and of lesser diameter and having threads formed thereon, said outer end and central portion being longitudinally centrally slotted in two directions at about right angles, said slots passing through said flutes, a collar having an internal tapered thread fitted on said outer end, the outer diameter of said collar being not greater than the diameter at the root of said cutting teeth and means in said slot for expanding the threaded lands for holding said tap rigidly against said collar, said means including a bar which is cruciform in cross-section fitted into said slots within said central portion and a screw threaded into said slots at the outer end of said body.

8. An adjustable tap comprising a body having a shank, the inner end having means for rotating the same, a plurality of longitudinal external flutes in the central portion of said body separating intermediate lands, cooperating cutting teeth on the lands between said flutes, the outer end of said body being tapered and of lesser diameter and having threads formed thereon, said outer end and central portion being longitudinally centrally slotted, a collar having an internal tapered thread fitted on said outer end, the outer diameter of said collar being not greater than the diameter at the root of said cutting teeth and means in said slot for expanding the threaded lands for holding said tap rigidly against said collar, said slotted outer end being threaded and a screw fitted therein constituting said means, the head of said screw being tapered, a tapered shoulder on the extreme outer end of said tap and adapted to contact with said head.

JACOB BRUSSELL.